Feb. 26, 1957 J. R. COLEMAN 2,782,886
MOUNTING FOR STEEL WINDOW FRAMES
Filed July 8, 1953 3 Sheets-Sheet 1
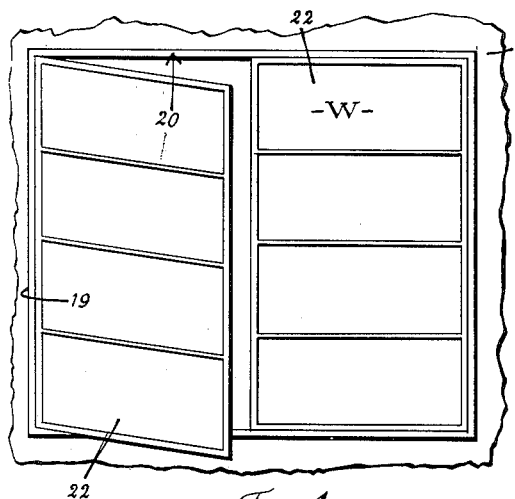
Fig. 1
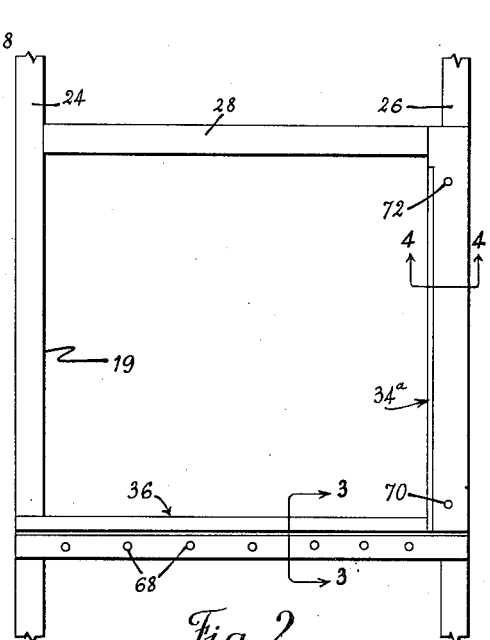
Fig. 2
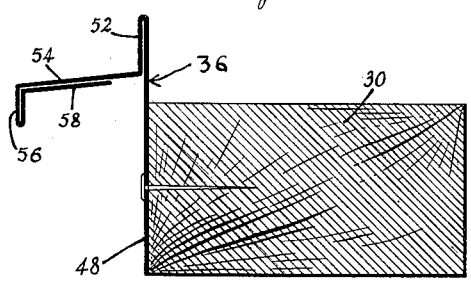
Fig. 3
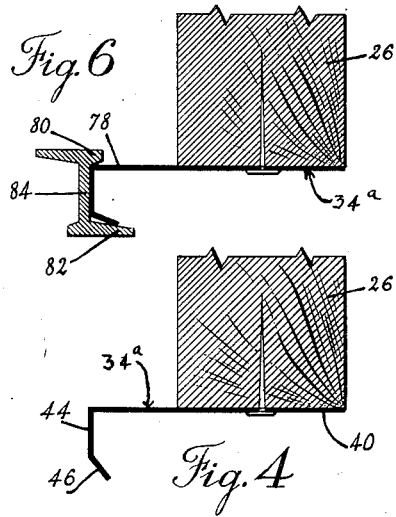
Fig. 6
Fig. 4
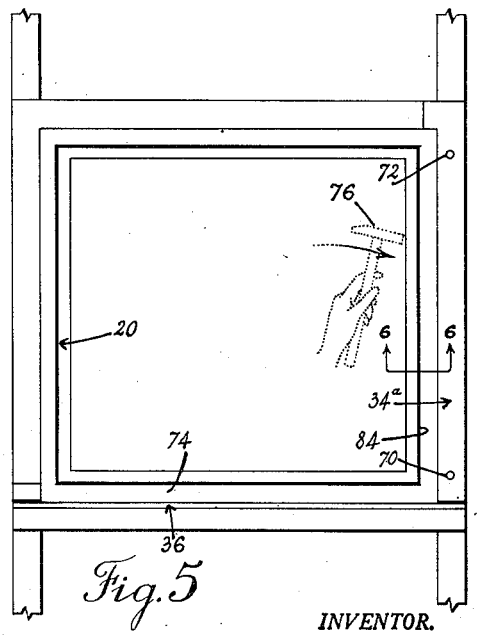
Fig. 5
INVENTOR.
JOHN R. COLEMAN
BY Fulwider, Mattingly
& Babcock
ATTORNEYS Feb. 26, 1957  J. R. COLEMAN  2,782,886
MOUNTING FOR STEEL WINDOW FRAMES
Filed July 8, 1953  3 Sheets-Sheet 2

INVENTOR.
JOHN R. COLEMAN
BY Fulwider, Mattingly
& Babcock
ATTORNEYS

Feb. 26, 1957 J. R. COLEMAN 2,782,886
MOUNTING FOR STEEL WINDOW FRAMES
Filed July 8, 1953 3 Sheets-Sheet 3

INVENTOR.
JOHN R. COLEMAN
BY Fulwider, Mattingly
& Babcock
ATTORNEYS.

United States Patent Office 2,782,886
Patented Feb. 26, 1957

2,782,886

MOUNTING FOR STEEL WINDOW FRAMES

John R. Coleman, Long Beach, Calif.

Application July 8, 1953, Serial No. 366,794

4 Claims. (Cl. 189—75)

The present invention relates generally to window constructions, and more particularly to an improved surround for mounting a steel window frame within the window opening of a building.

This application is a continuation-in-part of my abandoned application Serial No. 339,745, filed March 2, 1953, entitled Mounting for Steel Window Frames.

The use of steel window frames in industrial and domestic buildings has modernly come into wide acceptance. Steel window frames provide many advantages over those formed of wood; chief among these being increased durability and improved appearance. That the use of steel window frames has not gained even wider acceptance is primarily because of the difficulty involved in installing them in a window opening with the heretofore-proposed frame mounting means. Such mounting means generally include a sheet metal structure termed a "surround," which surround is interposed between the window frame and the actual window opening of the building. The steel window frame is then rigidly attached to the surround by means of screws or nuts and bolts. In addition to serving as a mounting means for the steel window frame or sash, the surround is intended to act as a weather-tight seal, preventing the entrance of moisture past the window opening. The heretofore-proposed surrounds, although generally satisfactory, require at least two men for their installation and the attachment of the steel window frame thereto. Additionally, the heretofore-proposed surrounds have often been ineffective in restraining the passage of moisture past the window opening unless provided with special sealing materials whereby the installation of the steel window frame is made unnecessarily complicated.

It is a major object of the present invention to provide a novel surround for use in installing steel window frames.

It is another object of the present invention to provide a novel surround, the installation of which, and the attachment of a steel window frame to, requires only a single workman utilizing hammer and nails. It will be readily appreciated that inasmuch as the surround of the present invention requires the services of but a single workman, the cost of installing a steel window frame therewith may be quite low as compared to the heretofore-proposed surrounds.

A further object of the invention is to provide a novel surround which permits a steel window frame to be installed in a building in a minimum amount of time.

Another object of the present invention is to provide a surround which is completely weathertight.

Another object of the invention is to provide a surround which not only serves as a rigid connection between the wooden studs defining a window opening in a building and the steel window frame or sash, but which also serves as a "flashing" or moisture-restraining means between the window opening and the interior of the building. In this manner, the use of a separate sealing material is not required.

It is a further object of the invention to provide a novel surround which cooperates with the siding material utilized as an exterior finish on the building to solidly retain the metal window sash in place within the window opening.

A further object of the invention is to provide a novel method for installing a metal window frame in a building.

An additional object of the invention is to provide a novel surround to which a steel window frame may be rigidly attached without the use of additional fastening means.

These and other objects and advantages of the present invention will become apparent from the following detailed description of a preferred embodiment thereof, when taken in conjunction with the appended drawings wherein:

Figure 1 is an outside view showing a steel window which has been mounted by the use of a preferred form of surround embodying the present invention;

Figure 2 is a front view showing an initial step in the installation of a steel window frame by the use of said surround;

Figure 3 is an enlarged vertical sectional view of the sill element of said surround taken along line 3—3 of Figure 2;

Figure 4 is an enlarged fragmentary horizontal sectional view of the jamb element of said surround, taken along line 4—4 of Figure 2;

Figure 5 is a front view showing another step in the installation of a steel window frame by the use of said surround;

Figure 6 is an enlarged fragmentary horizontal sectional view taken on line 6—6 of Figure 5;

Figure 7:
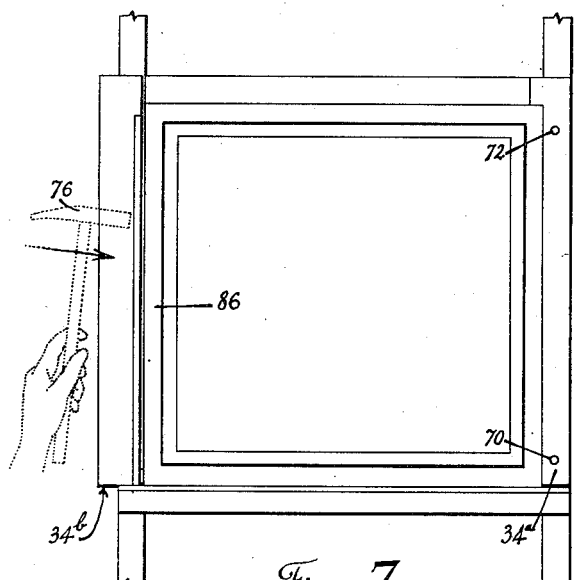
Figure 7 is a front view of a later step in the installation of a steel window frame by the use of said surround.

Referring now to the drawings, and particularly to Figure 1 thereof, there is shown a portion of a wall 18 wherein is formed a rectangular window opening 19. A steel window frame or sash 20 pivotally supporting a pair of casement panels 22 is mounted in the opening 19 by means of the novel surround (not visible in this figure) embodying the present invention.

With reference now to the other figures, the rectangular window opening 19 is defined by a pair of vertically extending side studs 24 and 26, a horizontal header 28 and a horizontal sill plate 30. The steel window sash 20 is generally Z-shaped in cross-section, and is mounted within the opening 19 by means of a pair of identical side or jamb surround elements generally designated 34a and 34b, a sill surround element, generally designated 36, and a top surround element, generally designated 38. Each of these surround elements will preferably be formed of a resilient sheet metal, which metal should either be corrosion-resistant of itself or coated with a corrosion-resistant material, as for example, paint. Alternately, the metal may be galvanized.

Both of the jamb surround elements 34a and 34b may comprise a transverse flat base 40 which is bent forwardly at right angles at its end extending into the window opening so as to define a forwardly extending leg 44. The front portion of this leg 44 is bent outwardly and forwardly so as to define a resilient lip 46.

The sill surround element 36 will comprise a flat upwardly extending base 48; the upper portion of which base is doubled-over at its upper end so as to define a vertical locking leg 52. From the lower end of this locking leg 52 the surround element is bent forwardly so as to define a downwardly inclined surface 54. At the front end of this surface the surround element is doubled-over so as to define a depending flange 56 and a rearwardly extending section 58.

The top surround element 38 may be identical to the side surround elements having a downwardly extending base 60 at the lower end of which is formed a forwardly extending leg 64. The front portion of this leg 64 is bent outwardly and upwardly so as to define a resilient lip 66.

Referring now to Figure 2, the first step in installing a steel window sash by the use of the preferred surround embodying the present invention is the securing of the sill surround element 36 to the face of the sill plate 30. This may be accomplished by the use of several nails 68. Next, the right-hand surround element 34a should be secured to the right-hand stud 26. For this purpose a single nail 70 may be driven at the lower portion of the surround element and a second nail 72 may be tacked, but not permanently driven, through the upper portion thereof.

Referring now to Figure 5, the rectangular steel window sash 20 is next brought into the window opening 32 with its lower piece 74 resting upon the top of the sill surround element 36. Thereafter, force should be applied, as by the use of a hammer 76, urging the right side piece 84 of the sash against the right jamb surround element 34a. At this point it should be particularly observed that the outer portion of the window sash 20 includes a transverse projection 80 at its rear end and a transverse flange 82 at its front end. When the window sash 20 is forced against the right jamb surround element 34a the latter will be restrained against movement to the right by the nails 70 and 72. Accordingly, the rear end of the leg 44 and the front of the lip 46, will be wedged between the sash projection 80 and flange 82, respectively; the lip 46 being sprung rearwardly by such insertion, as clearly indicated in Figure 6. When this has occurred, the side piece 84 of the sash will be securely locked against forward or rearward movement relative to the jamb surround element 34a.

Referring now to Figure 7, the next step in installing the steel window sash 20 is to bring the left jamb surround element 34b into a position adjacent to and substantially parallel with the left-hand piece 86 of the window sash. Thereafter, the left jamb surround element 34b is forced against the sash piece 86, as by means of the hammer 76. This force will move the surround element 34b to the right in Figure 7 so as to wedge the rear end of leg 44 and the front of the lip 46 thereof between the projection 80 and flange 82 of the left-hand sash piece 86. When this wedging action has taken place, the left jamb surround element 34 may be nailed permanently to the left stud 24, as by nails 88.

The next step in mounting the steel window sash 20 requires that the top surround element 38 be urged downwardly, as by hammer 76, so as to wedge the rear end of the leg 64 and the front of the lip 66 thereof between the projection 80 and flange 82 of the top piece 90 of the window sash. When this has been accomplished, the top surround element may be permanently nailed to the header 28, as by nails 91. At this time it may be necessary to remove the upper nail 72 and adjust the position of the right jamb surround element 34a. Thereafter, this surround element may be permanently secured to the right stud 26, as by nails 92.

Figure 10:
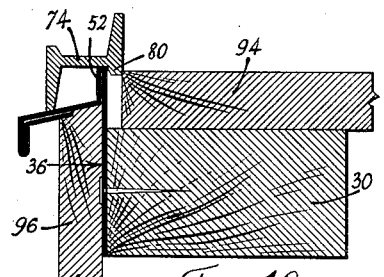
Figure 10 is an enlarged vertical sectional view taken on line 10—10 of Figure 9 after siding material has been installed.

Referring to Figure 10, a stool 94 may now be secured to the upper surface of the sill plate 30 so as to fill in the space between the upper surface of this sill plate and the lower portion of the bottom sash piece 74. This bottom sash piece will then be locked against forward movement relative to the window opening 19 by the abutment of the front of its projection 80 with the rear upper end of the locking leg 52 of the sill surround element, and against rearward movement relative thereto by virtue of the abutment of the rear of this projection with the front end of the stool 94. Siding material 96 may then be nailed to the face of the sill plate 30; the upper end of this siding being in abutment with the underside of the sill surround element 36.

Figure 11:
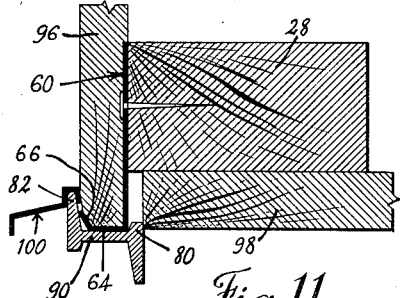
Figure 11 is an enlarged vertical sectional view of the head element of said surround, taken along line 11—11 of Figure 9 after siding material has been installed.
Figure 8:
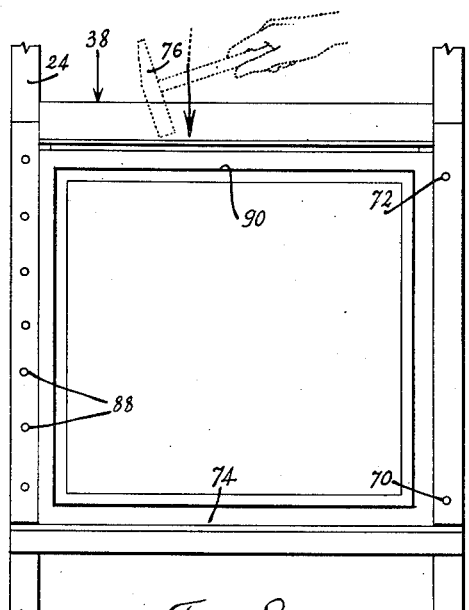
Figure 8 is a front view of a final step in the installation of a steel window frame by the use of said surround.
Figure 9:
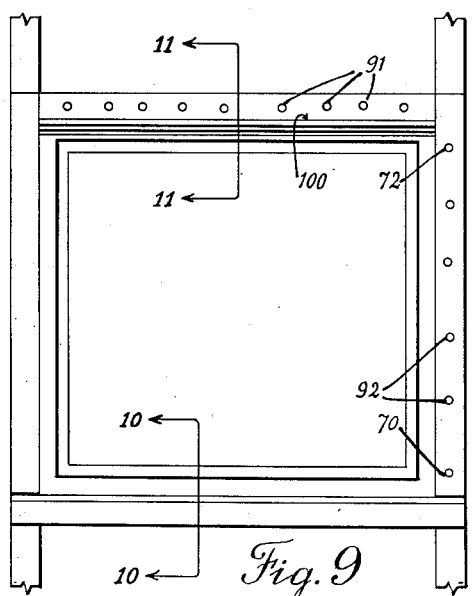
Figure 9 is a front view showing a steel window frame as installed in a window opening by the use of said surround.

Referring now to Figure 11, a finish piece 98 may be secured to the underside of the header 28 so as to fill in the space between the underside of the header and the upper portion of the upper sash piece 90. Siding material 96 may then be secured to the front of the header. It should be particularly noted that the lower portion of this siding 96 is tapered whereby it may be received between the front of the base 60 and the rear of the lip 66. The lip 66 presses tightly against the front of the upper sash piece 90 at this point, preventing the entrance of moisture between the exterior of the building and the window opening 19. The upper sash piece 90 will be locked against rearward movement relative to the window opening by the abutment of the rear of its projection 80 with the front of the finish piece 98, and against forward movement by the siding 96. A metal drip plate 100 may be inserted between the front of the siding 96 and the rear of sash.

Referring to Figure 6, siding material (not shown) may then be secured to the front of the side studs, said siding material filling the space between the leg 40 and the flange 82. When such siding has been installed, the side sash pieces 84 and 86 will be rigidly locked against movement relative to the window opening thereby. The front of the lip 46 of the two jamb surround elements presses tightly against the front of the flanges 82 of the side sash pieces all along the latter's length so as to restrain the entrance of moisture into the building through the window opening. Additionally, by virtue of the width of the leg 40 of these jamb surround elements 34a and 34b, such surround elements may serve as flashing between the window sash and the studs defining the window opening. Hence, no special flashing material is required. Referring to Figure 6 it should be noted that a space 81 exists between the sash flange 82 and the inner portion of the lip 46 of the jamb surround element 34a. The existence of this space 81 acts as a barrier against the occurrence of capillary attraction of moisture between the sash and the surround element whereby the danger of corrosion is avoided.

The hereinbefore-described surround construction permits the installation of a steel window sash in a minimum amount of time and by a single workman. A large number of the surround elements may be easily shipped at once inasmuch as they are readily nestable. Additionally, the use of the present surround permits mounting the front of the window sash substantially flush with the external edge of the building whereby a smooth and aesthetically-pleasing modern appearance is provided.

Figure 12:
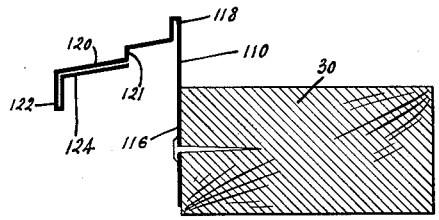
Figure 12 is a vertical sectional view of the sill element of a modified form of surround embodying the present invention.

Referring now to Figures 12 through 17, the modified form of surround embodying the present invention includes a sill surround element generally designated 110, a pair of jamb elements, generally designated 112, and a top surround element, generally designated 114. As shown in Figure 12, the sill surround element 110 comprises a flat upwardly extending base 116, the upper portion of which base is doubled-over at its upper end so as to define a vertical locking leg 118. From the lower end of this locking leg the surround element is bent forwardly so as to define a downwardly inclined surface 120. It should be noted, however, that a downward sash flange-receiving step 12 is formed at the intermediate portion of the surface 120. At the front end of this surface 120, the surround element is again doubled-over so as to define a depending flange 122 and a rearwardly extending section 124.

Figure 14:
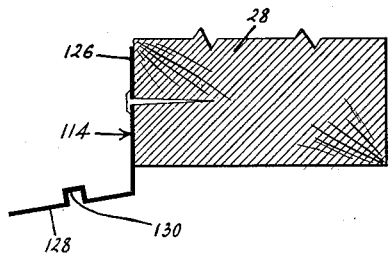
Figure 14 is a vertical sectional view of the head element of said modified form of surround.

Referring now to Figure 14, the top surround element 114 includes a downwardly extending base 126, at the lower end of which is formed a forwardly and downwardly extending leg 128. At the intermediate portion of leg 128 there is formed an upwardly extending sash flange-receiving groove 130. It should be noted that the sides of this groove 130 are inclined to the vertical.

Figure 16:
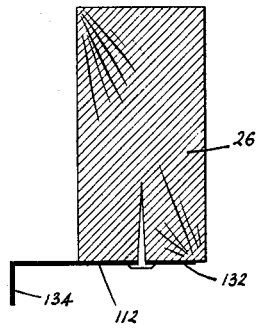
Figure 16 is a horizontal sectional view of the jamb element of a said modified form of surround; and, Figure 17 is a horizontal sectional view similar to Figure 16, but taken after siding material has been installed.

Referring to Figure 16, each of the jamb surround elements 112 comprises a flat base 132 which extends from one of the side studs toward the window opening. This base 132 is bent forwardly at a right angle at its end proximate the window opening so as to define a leg 134.

Figure 13:
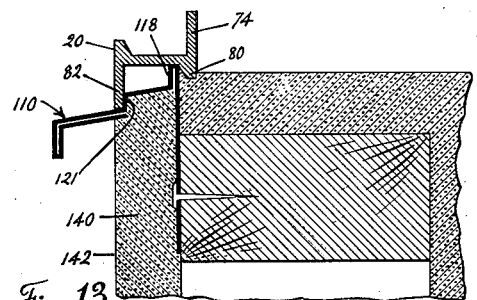
Figure 13 is a vertical sectional view similar to Figure 12, but taken after siding material has been installed.
Figure 15:
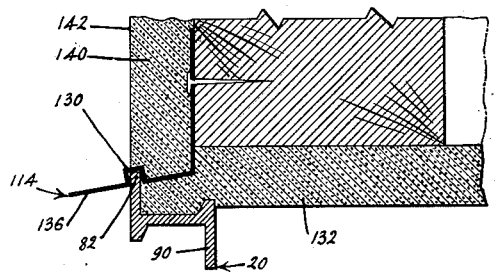
Figure 15 is a vertical sectional view similar to Figure 14, but taken after siding material has been installed.

To install a metal window sash 20 by means of the surround shown in Figures 12 through 17, substantially the same method is followed as in the case of the aforedescribed preferred form of surround. It should be observed, however, that the bottom sash piece 74 will be positively locked against movement relative to the window opening by the abutment of the front of its projection 80 with the rear of the locking leg 118 and the abutment of the rear of its flange 82 with the step 120, as shown in Figure 13. With reference to Figure 15, it will be noted that the upper sash piece flange 82 may be held in place by means of the groove 130 of the top surround element 114 until the finish plaster 132 is applied below the header 28. Further, it should be noted that the front portion 136 of the top surround element defines a drip plate which is integral therewith. Accordingly, moisture is effectively restrained from passing between the exterior of the building and the upper portion of the window opening.

Figure 17:
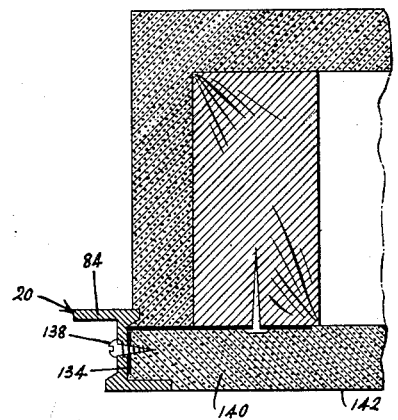

Referring now to Figure 17, the side sash piece 84 is secured to the leg 134 of the jamb surround element 112 by means of screws 138, or the like. To this end, each jamb surround element may be formed with longitudinally spaced bores for receiving such screws.

Once the window sash 20 has been secured to the surround elements 110, 112 and 114, plaster siding material 140 may be applied. The exterior surface 142 of such plaster will preferably coincide with the front surface of the window sash 20. With particular reference to Figure 17, it will be noted that by the use of the surround of the present invention the sash 20 may be used as a mold for applying the plaster siding 140. Once such plaster has hardened it will serve to rigidly hold the sash 20 in place. It should be observed that since the sides of the groove 128 of the top surround element 114 is inclined relative to the upper sash piece flange 82, a space 145 will exist between this flange and the top surround element 114. The existence of this space 145 acts as a barrier to the capillary attraction of moisture into the groove 128.

While there has been shown what is at present believed to be the preferred embodiment of the present invention, it will be apparent to those skilled in the art that various modifications and changes may be made with respect thereto. For example, although the siding material in Figures 1 through 11 is shown as being of wood, while that of the remaining figures is indicated as being plaster, either wood or plaster may be utilized with both forms of surrounds. Additionally, it should be noted that either of the two forms of sill and top surround elements may be utilized with either of the two forms of jamb surround elements. All such modifications and changes are intended to be included in the spirit of the present invention and the scope of the appended claims.

I claim:

1. A window structure, comprising: a wall having an opening therein, the front portion of said wall being covered by siding material and the inwardly-facing surfaces of said opening being covered by finishing material; a generally Z-shaped in cross-section metal window sash disposed in the front portion of said opening and having a flat intermediate section parallel with the adjacent inwardly-facing surface of said opening; a transverse projection formed on the rear end of said sash in line with said rear transverse flange and extending toward the adjacent inwardly-facing surface of said opening; a front transverse flange formed on the front portion of said sash and extending away from said opening with its front surface substantially coinciding with the front surface of said siding material, the latter material extending behind said last-mentioned flange so as to assist in holding said sash in place, and said finishing material engaging said projection so as to assist in holding said sash in place; a metal surround that secures said sash in place until said siding and finishing material is applied, said surround including an elongated, flat base attached to the front surface of said wall before said siding and finishing material is applied so as to extend into said opening, and a forwardly-extending leg integrally formed on the end of said base that extends into said opening, said siding and finishing material covering said surround to as to protect it from the elements; and attachment means for securing said leg to said sash.

2. A window structure as set forth in claim 1 wherein said attachment means includes a forwardly and outwardly extending flexible lip formed on the front of said leg, said sash being secured to said surround solely by wedging the rear of said leg and the front of said lip between said front transverse flange and said projection.

3. In a window structure that includes a wall having an opening therein, the front portion of the wall being covered by siding material and the inwardly-facing surfaces of said opening being covered by finishing material, a generally Z-shaped in cross-section metal window sash disposed in the front portion of said opening and having a flat intermediate section parallel with the adjacent inwardly-facing surface of said opening, a rear transverse flange formed on the rear portion of said sash and extending into said opening, a transverse projection formed on the rear of said sash in line with said rear transverse flange and extending towards the adjacent inwardly-facing surface of said opening, and a front transverse flange formed on the front portion of said sash and extending away from said opening with its front surface substantially coinciding with the front surface of said siding material, the combination of a metal surround that encompasses said window sash and secures it in place until said siding and finishing material is applied, said surround including an elongated flat base attached to the front surface of said wall before said siding and finishing material is applied so as to extend into said opening, and a forwardly extending leg integrally formed on the end of said base that extends into said opening, said siding and finishing material covering said surround so as to protect it from the elements and said siding material extending behind said front transverse flange so as to assist in holding said sash in place and said finishing material engaging said projection so as to assist in holding said sash in place; and attachment means for securing said leg to said window sash.

4. The combination as set forth in claim 3 wherein said attachment means includes a forwardly and outwardly extending flexible lip formed on the front of said leg, said window sash being secured to said surround solely by wedging the rear of said leg and the front of said lip between said front transverse flange and said projection.

References Cited in the file of this patent

UNITED STATES PATENTS

| | | |
|---|---|---|
| 1,483,851 | Perry | Feb. 12, 1924 |
| 1,736,237 | Whitaker | Nov. 19, 1929 |
| 1,840,221 | Bridges | Jan. 5, 1932 |
| 2,482,170 | Gunnison | Sept. 20, 1949 |
| 2,635,720 | Kolkey et al. | Apr. 21, 1953 |